Dec. 19, 1922.

G. MOORE.
SHOE FOR RESILIENT TIRES.
FILED NOV. 9, 1920.

1,439,527.

INVENTOR
GEORGE MOORE
BY
Joseph B. Gardner
his ATTORNEY

Patented Dec. 19, 1922.

1,439,527

UNITED STATES PATENT OFFICE.

GEORGE MOORE, OF OAKLAND, CALIFORNIA.

SHOE FOR RESILIENT TIRES.

Application filed November 9, 1920. Serial No. 422,761.

*To all whom it may concern:*

Be it known that I, GEORGE MOORE, a citizen of the United States, and a resident of Oakland, county of Alameda, and State of California, have invented a new and useful Shoe for Resilient Tires, of which the following is a specification.

My invention relates to a removable metallic shoe or tread which is arranged to be placed over the tread portion of the ordinary resilient tire and secured thereto.

An object of the invention is to provide a metallic tread formed of a minimum number of parts, which can be readily placed upon the tire or removed therefrom without the necessity of deflating the latter.

Another object of the invention is to provide an almost continuous metallic tread of the type described which will not impair the shock absorbing qualities of the tire.

Another object of the invention is to provide means for securing the abutting ends of the removable metallic treads so that the tire adjacent said ends will not be affected by the break in the continuity of the tread.

The invention possesses other objects and features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to said drawings.

Figure 1:
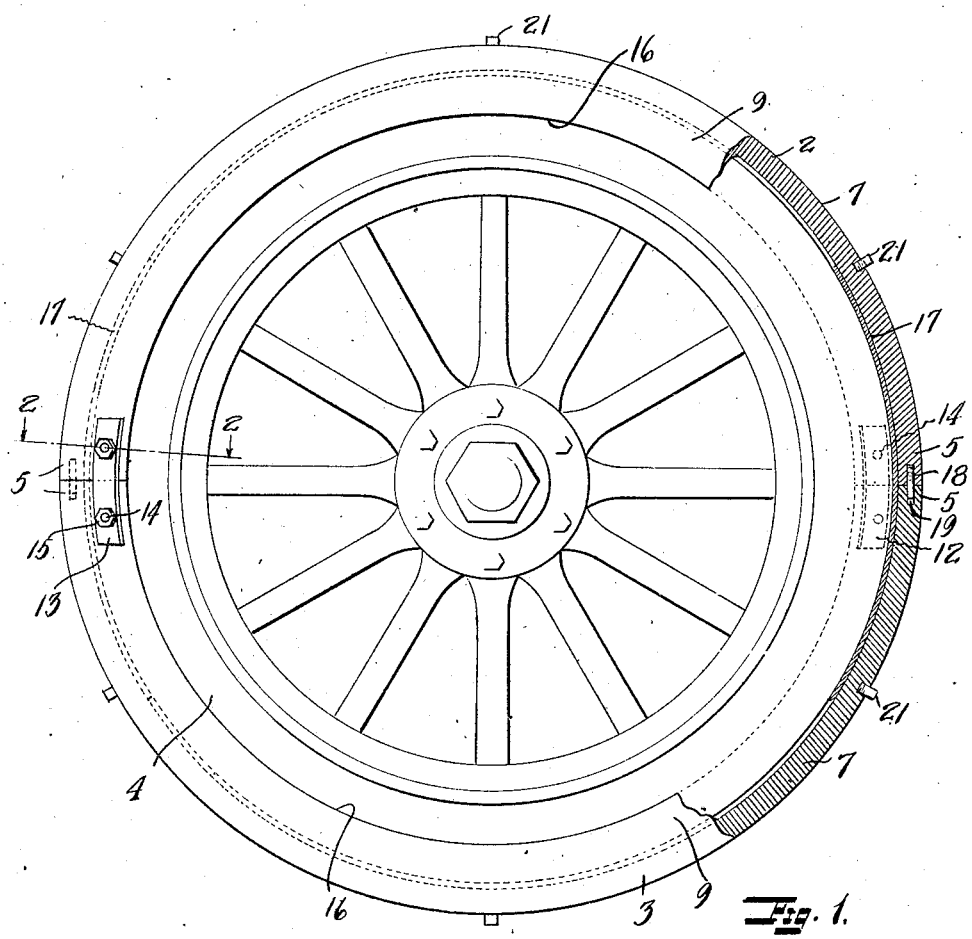
Figure 1 is a side elevation of a tire equipped with the metallic tread or shoe of my invention, parts of the shoe being broken away and shown in section to disclose the construction more clearly.

In the present embodiment the shoe or tread 2 of my invention comprises a pair of semi-circular sections 2 and 3 preferably cast or otherwise formed of iron, steel or the like, which are arranged to encircle the resilient tire 4 with their adjacent ends 5 abutting against each other. Each section is formed with a centrally disposed circumferential tread portion 7 of substantially the same width as the usual tread 8 of the resilient tire. Extending laterally from the opposite sides of the tread portion 7 are circumferential flanges 9 which are arranged to overlie the sides of the tire.

Figure 2:
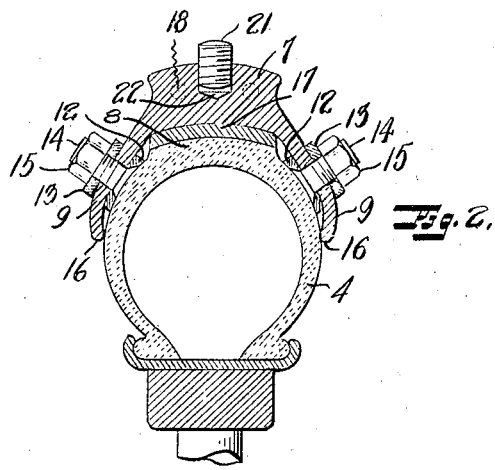
Figure 2 is a transverse section of the tire and shoe taken on the line 2—2 of Figure 1.

Means are provided for securing the sections together in such a manner that they will function as one member and the tire will be unaffected by the break in the continuity thereof. As will be noted by referring to Figure 2 the inner surface of the tread portion and flanges of the shoe are arranged to be spaced from the adjacent surface of the tire, and disposed on the inner and outer sides of the flanges at the ends 5 are plates 12 and 13 respectively, which preferably overlap each section equally. Passing through each set of plates and the adjacent ends 5 of the sections are taper headed bolts 14 which are preferably engaged on the outer side of the plate 13 by nuts 15, thus locking the sections securely together. The lateral extremities 16 of the flanges are preferably curved inwardly and engage the sides of the tire, thereby preventing the entrance of pebbles or similar particles between the tire and shoe. Arranged between the shoe 7 and the tire tread 8 and intermediate the plates 12 is a metallic segmental liner 17 preferably about equal in length to the radius of the wheel upon which the tire is mounted. One-half of the liner is adapted to be positioned on each side of the junctures of the sections and its length is such as to cause the adjacent ends of the sections to be held against radial displacement when the wheel supports a comparatively heavy load. By the use of the foregoing construction a very rigid structure is assured and the shoe will function as a single continuous member. It will be noted that both sections as well as the means for securing the same together are all disposed solely on the tire, in other words there is no direct connection between the shoe and any part of the wheel except the tire. In this manner there will be substantially no impediment to the proper functioning of the cushioning qualities of the tire.

Means are also provided for preventing the lateral displacement of the adjacent ends 5 of the sections. In the present form of the invention this is simply provided for by forming one end of the sections with circumferentially extending pins 18 which are adapted to engage in aligned apertures 19 formed in an abutting end.

As here shown the shoe is provided with studs 21 which engage in threaded apertures 22, thereby permitting increased tractive force should conditions warrant.

It will now be readily understood that by the use of the tire shoe of my invention a very inexpensive and efficient wearing surface may be incorporated with the usual resilient tire, and furthermore one which can be placed on the tire or removed therefrom very quickly.

I claim:

1. A shoe for resilient tires, comprising a pair of semi-circular tread sections adapted to abut against each other at adjacent ends and arranged to encircle the tire, a segmental liner arranged to be removably held between said sections and tire at the juncture of said sections by the pressure of the inflated tire without mechanical connection to said sections.

2. A shoe for resilient tires, comprising a set of metallic segmental tread sections adapted to abut at adjacent ends and encircle the tire, a segmental metallic liner arranged to be removably held between said tread sections and said tire at the juncture of said tread sections by the pressure of the inflated tire against said liner and said tread sections, and means on the outer side of the end portions of said tread sections for securing said tread sections together.

3. A shoe for resilient tires comprising a pair of semi-circular metallic tread sections adapted to abut at adjacent ends and encircle a tire, a metallic segmental liner arranged to lie between said sections and said tire at the juncture of said sections, a plate arranged between said sections and said tire at said juncture and at the side of said liner, a second plate arranged on the outer side of said sections and transversely aligned with said first plate, and means for securing said plates to said sections.

4. A shoe for resilient tires, comprising a pair of semi-circular metallic sections having a tread portion arranged to overlie the tread of said tire, circumferential flanges extending from the opposite sides of said tread portion and having their lateral extremities adapted to engage the sides of the tire, said metallic tread and said flanges being arranged to lie spaced from the adjacent portion of the tire, a segmental metallic liner adapted to lie between said metallic tread and the tire tread at the juncture of said sections, plates on the opposite sides of said flanges at said juncture, and bolts passing through said plates and flanges for securing the abutting ends of said section together.

5. A shoe for resilient tires, comprising a pair of semi-circular metallic sections having a tread portion arranged to overlie the tire tread, circumferential flanges extending from the opposite sides of said tread portion and having their lateral extremities adapted to engage the sides of the tire, a segmental metallic liner substantially equal in length to the radius of the tire wheel arranged to lie between the tread portions of said sections and tire at the juncture of said sections, the opposite ends of the liner being arranged to lie substantially equidistant from said juncture, plates on the opposite side of said flanges at said juncture, means for securing said plates together and to the abutting sections, and means for holding the abutted ends of the sections against lateral displacement.

In testimony whereof, I have hereunto set my hand at Oakland, California, this 30th day of October, 1920.

GEORGE MOORE.

In presence of—
L. L. M. SALSBURY.